UNITED STATES PATENT OFFICE.

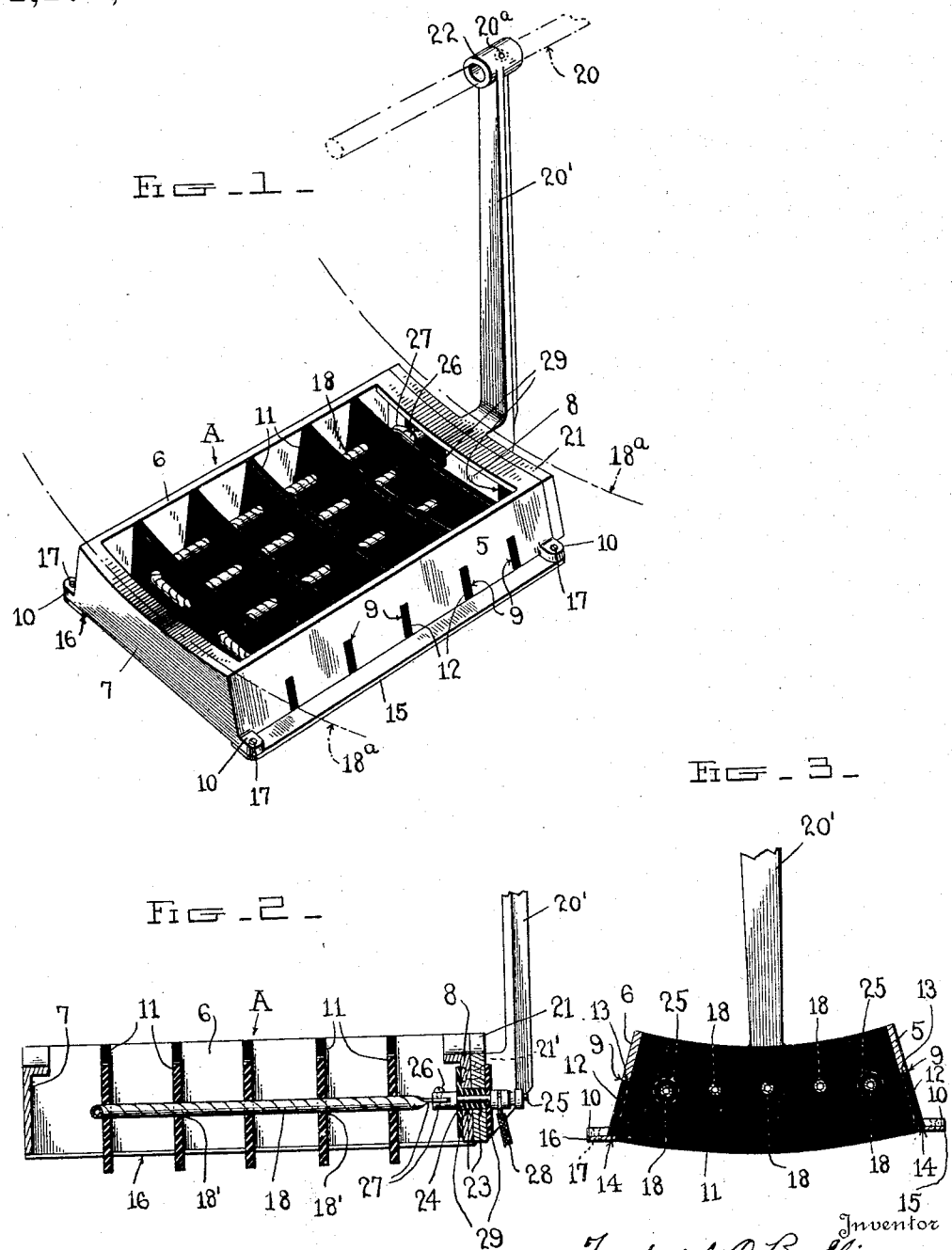

FREDERICK O. BULLIS, OF LOUISVILLE, KENTUCKY, ASSIGNOR TO LEKTRIC SALES COMPANY, OF LOUISVILLE, KENTUCKY, A CORPORATION OF KENTUCKY.

ELECTRIC HEATER.

1,176,814.  Specification of Letters Patent.  Patented Mar. 28, 1916.

Application filed September 2, 1914. Serial No. 859,857.

*To all whom it may concern:*

Be it known that I, FREDERICK O. BULLIS, a citizen of the United States, residing at Louisville, in the county of Jefferson and State of Kentucky, have invented certain new and useful Improvements in Electric Heaters, of which the following is a specification.

This invention relates to electric heaters. One object of the invention is to provide an electric heater particularly adapted for popping corn and for roasting peanuts, coffee and the like in rotatable drums, cylinders and analogous devices.

Another object resides in the provision of an electric heater whose inner heating surface is formed preferably upon the arc of a circle corresponding to the curvature of a drum, cylinder or the like in which the corn may be popped or the peanuts or coffee roasted, the curvature of the heating surface of the heater permitting the heater to lie close to the drum or cylinder throughout its entire heating surface to provide for radiation of uniform heat throughout its heating surface.

A still further object is to provide a simple, inexpensive, durable and efficient electric heater which is particularly adapted for the purposes stated and which may have swinging movement beneath the drum or cylinder.

With the above and other objects in view, the present invention consists in the combination and arrangement of parts hereinafter more fully described, illustrated in the accompanying drawings, and particularly pointed out in the appended claims, it being understood that changes may be made in the proportions, size, materials and minor details without departing from the spirit or sacrificing any of the advantages of the invention.

In the drawings: Figure 1 is a perspective view of an electric heater constructed in accordance with the present invention and which is illustrated as suspended beneath a cylinder, drum or other popping or roasting device disclosed in part in dotted lines. Fig. 2 is a longitudinal sectional view. Fig. 3 is a transverse sectional view.

Referring now more particularly to the accompanying drawings, the reference character A indicates a metallic or other frame which is preferably, although not necessarily, rectangular in form, consisting of side walls 5 and 6 and end walls 7 and 8. The upper edges of the end walls are preferably formed upon the arc of a circle while the side walls preferably converge inwardly and along their lower edges have oppositely disposed slots 9 and outwardly directed lugs 10 at their ends.

Non-conducting ribs 11 are disposed within the frame and are notched at their ends to form ears 12 and upper and lower shoulders 13 and 14, respectively.

The ribs 11 may be fitted or positioned in the frame A by insertion through the outer side of the frame so as to position the ears 12 in the aforesaid slots 9 with the shoulders 13 against the inner ends of the said slots. The ribs may be held against accidental outward movement or displacement by suitable locking bars 15 and 16 which extend along the under or outer edges of the side walls 5 and 6 and overlap the lower or outer shoulders 14 of the ribs. These locking bars are detachably secured at their ends to the aforesaid lugs 10 by means of screw-bolts or other suitable fastenings 17.

A resistance coil or heating element 18 is supported by the non-conducting ribs 11 in any suitable manner. One way in which the heating element may be supported by the ribs 11 is to provide the ribs with alining apertures 18' through which the heating elements may be inserted and interlaced with the ribs, as shown or in any other suitable manner.

The terminal ends 27 of the heating element 18 may be coupled at 26 in any suitable manner to the binding posts 25 mounted in suitable insulating bushings 24 disposed in one end of the frame A and in a plate 21, there being other insulating material 29 between the binding posts and the end 8 and the plate 21.

The plate 21 is formed with or secured to the lower end of an arm 20' and the plate 21 may be secured to the end of the frame A by means of suitable rivets 21' or in any other suitable manner.

The arm 20' is designed for the purpose of suspending the heater under a cylindrical or other popping-drum or roaster and to this end it has a journal 22 by means of which it may be journaled or swingingly mounted on a shaft or other means 20. The heater may be held stationary, if desired, by inserting a suitable key (not shown) in the aperture 20ª of the journal or hub 22. However, in one use of the heater at least the same is adapted to swing into and out of operative position with relation to a drum, and be located beneath the same as shown in the accompanying drawings, wherein the lower portion of a cylindrical or other drum is shown in dotted lines at 18ª.

As illustrated in the accompanying drawings, the inner face of the heater is curved transversely or formed upon the arc of a circle conforming to the curved surface of the cylinder or the like 18ª and lies close thereto to efficiently heat the same or the goods contained therein.

By virtue of the curved inner surface of the heater it may effectually heat the entire surface of a cylinder lying adjacent thereto or uniformly heat the goods within the cylinder within the area of the heater and it may lie at all times in the same relation to the annular wall of a drum or cylinder whether positioned to the right or to the left of or under or over the axis of the drum or when being shifted from one position to another with relation to the drum or cylinder.

To supply electrical fluid to the heater for heating purposes suitable conductors 28 may be connected to the binding posts 25 and lead from any suitable source.

What is claimed is:

1. An electric heater comprising a rectangular shaped frame whose ends are formed upon the arc of a circle and whose side walls converge and which are slotted along their outer edges, spaced non-conducting supporting ribs having their ends notched to provide ears and shoulders, the ears adapted to fit in the slots of the side walls of said frame, each of said side walls having outstanding lugs, locking bars detachably secured to said lugs and adapted to engage the shoulders of said ribs to lock the same against displacement, the ribs having apertures, and a heating coil supported in the apertures of said ribs, the inner edges of the ribs being formed on a curve corresponding to the curvature of the inner edges of the end walls of the frame, and binding posts connected to the terminals of said heating coil.

2. An electric heater comprising a rectangular shaped frame whose ends have their inner edges formed upon an arc of a circle and whose side walls converge inwardly and which are slotted along their outer edges, spaced non-conducting ribs having their ends fitted in the slots of the side walls and whose inner edges are formed upon a curve corresponding to the curvature of the inner edges of the end walls, locking bars secured to the frame to fasten the ribs within the frame, a heating coil supported within the frame by said ribs, and binding posts supported in the frame and connected to the terminals of the heating coil.

3. An electric heater comprising a rectangular shaped frame having opposite side walls slotted along their outer edges, spaced non-conducting ribs having their ends removably fitted in the slots of said walls, locking bars secured to the frame to detachably fasten the ribs within the frame, a heating coil supported by said ribs, and binding posts secured to the frame and connected to the terminals of the heating coil.

4. An electric heater comprising a rectangular shaped frame whose ends have their inner edges formed upon the arc of a circle and whose side walls converge inwardly, spaced non-conducting ribs removably connected to the side walls and whose inner edges are formed upon a curve corresponding to the curvature of the inner edges of the end walls, a heating coil supported within the frame by said ribs and binding posts supported in the frame and connected to the terminals of the heating coil.

5. An electric heater comprising a frame, spaced non-conducting ribs removably mounted within the frame, a heating element supported by said ribs, and means for removably securing the ribs in the frame, the inner surface of the heater being curved transversely throughout the length of the heater.

6. An electric heater comprising a frame having outstanding lugs, ribs removably fitted within the frame, a heating element supported by said ribs, and means connected to said lugs and engaging the ribs and the outer edges of the sides of the frame to secure the ribs removably within the frame.

In testimony whereof I affix my signature in presence of two witnesses.

FREDERICK O. BULLIS.

Witnesses:
THOMAS J. COMER,
CHARLES L. STEPHENS.

Copies of this patent may be obtained for five cents each, by addressing the "Commissioner of Patents, Washington, D. C."